United States Patent [19]

Zucker et al.

[11] 3,805,247

[45] Apr. 16, 1974

[54] DESCRIPTION DRIVEN MICROPROGRAMMABLE MULTIPROCESSOR SYSTEM

[75] Inventors: Sandra Zucker, Malvern; Ulbe Faber, Honeybrook; Robert L. Davis, Phoenixville, all of Pa.

[73] Assignee: Burroughs Corporation, Detroit, Mich.

[22] Filed: May 16, 1972

[21] Appl. No.: 253,834

[52] U.S. Cl. .......... 340/172.5

[51] Int. Cl. .......... G06f 1/00

[58] Field of Search .......... 340/172.5

[56] References Cited

UNITED STATES PATENTS 3,425,039 1/1969 Bahrs et al. .......... 340/172.5

3,548,382 12/1970 Lichty et al. .......... 340/172.5

*Primary Examiner*—Raulfe B. Zache

*Attorney, Agent, or Firm*—Edmund M. Chung; Charles S. Hall; Edward G. Fiorito

[57] ABSTRACT

In a multiprocessor system, a source of description is provided in a unique work area assigned to each user program or process that references data and program stored in memory. Each description includes a first field defining the structure and format of the data, a second field specifying the location of the objects, the size of the object and any limits imposed, and a third field for controlling access and governing the data usage. Also included in each description are operating system flags which cause an operating system function to be executed at the microprogram level. Individual instructions of an instruction set for the multiprocessing system are executed with descriptions which interpret the instruction, executes the indicated instruction operation as defined by the fields of description, and may call for the next instruction.

7 Claims, 15 Drawing Figures

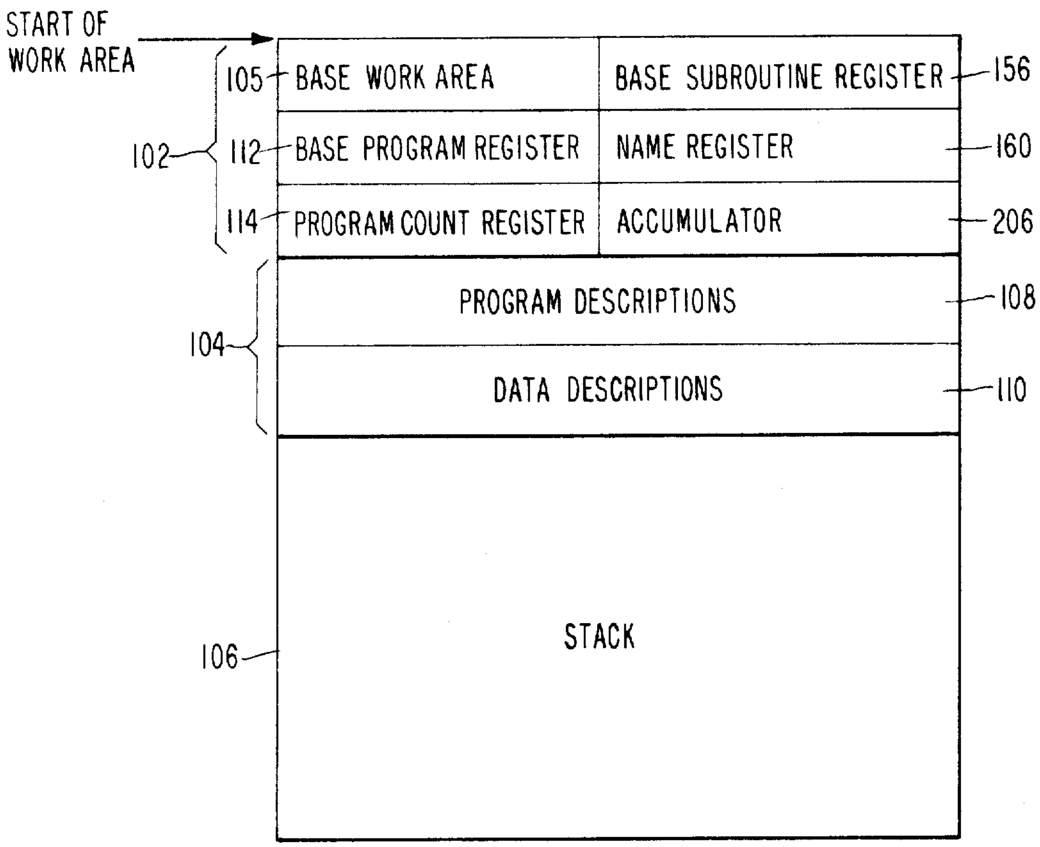

Fig 9

| TYPE DESCRIPTION | 122 OPERATING SYSTEM FLAGS | 118 QUALIFICATION FIELD | 116 FORMAT FIELD | 120 LOCATION FIELD |
|---|---|---|---|---|
| 128 INITIAL INDIRECT | PRESENCE BIT<br>MONITOR<br>DIRECT DESCRIPTION<br>TYPE INDIRECT | CONTROLS | ET<br>ST<br>UNIT | RELATIVE NAME REGISTER ADDRESS |
| 126 HOLDER INDIRECT | PRESENCE BIT<br>MONITOR<br>DIRECT DESCRIPTION<br>TYPE INDIRECT | | HOLDER | RELATIVE NAME REGISTER ADDRESS |
| 140 DIRECT DESCRIPTION | PRESENCE BIT<br>MONITOR<br>DIRECT DESCRIPTION<br>ALTER BIT | CONTROLS | SIZE | RELATIVE GLOBAL ADDRESS |

Fig 15

DESCRIPTION DRIVEN MICROPROGRAMMABLE MULTIPROCESSOR SYSTEM

BACKGROUND OF THE INVENTION

This invention relates to a multi-processor system using microprogrammable building blocks and more particularly to the implementation of a machine structure which can handle control structures more efficiently.

Conventional computer architecture dictates that arithmetic, control, and input/output functions of a computer system be implemented by hardwired logic. Once implemented, these functions are fixed and form a rigid set of machine performance characteristics for all applications of the machine. The shortcomings of this approach to computer system architecture are numerous and include: fixed machine characteristics which limit the cost effectiveness of the machine over a broad spectrum of applications; system reliability and hence availability suffers due to the concentration of hardwired computing functions in a single, complex hardware component called the mainframe.

The multiprocessor computer architecture successfully overcame some of the shortcomings of conventional computer systems by the use of multiple hardware modules interconnected by a system of exchange. Although this new approach permitted dynamic allocation of system resources and significantly improved system availability, the constraints of fixed performance characteristics remained.

In the development of a processing element with which the present invention is adapted, a new viewpoint and a complete review of traditional persuasions to system functions and implementation were undertaken. A single building block element configured into a system array became the nucleus of the multiprocessing systems.

Such a building block is fully disclosed in the Faber et al patent Application, Ser. No. 825,569 filed May 19, 1969, assigned to the same assignee as the present application, and is a cost-effective and performance-effective unit when functioning as a CPU, and I/O controller or a device controller. This flexibility is accomplished by designing the basic building block to contain fundamental, or primitive, registers and combinatorial logic while omitting the usual hardwired control logic found in conventional computer design. This building block thus represents initially uncommitted hardware logic which becomes committed to a given function by stored logic contained in an alterable source denominated the microprogram memory. This combination of stored logic and uncommitted hardware logic constitutes what is termed "system firmware," and the particular devices to which the firmware is interfaced, together with the firmware, define the performance characteristics for the machine.

In the Faber et al application, there is disclosed a microprogrammable unit or processor employing plural levels of subinstruction sets thereby providing a greater order of versatility in carrying out various algorithmic sequences. This versatility is achieved without the requirement of specific hardwired circuitry for each algorithmic sequence and also without requiring the programmer to specify each individual step of the sequence. Moreover, since a system of that invention can perform all algorithms under the control of plural levels of instructions sets, special circuits need not be provided for specific algorithms but only to provide the basic Boolean connectives.

In the prior art, a computer interprets and executes a sequence of machine codes which are its order set and the only code it can recognize. When each individual operation is performed, transfers of information occur among the functional components (e.g., registers, memory, adder, etc.) of the computer. The communication between functional components is caused by a set of primitive machine operations called micro-operations which consist of the opening and closing of gates and circuits between registers and the basic logic elements within the computer. Furthermore, in conventional computers the machine's order-set is totally defined and wired in a set of circuits within the control unit of the computer.

Microprogramming, on the other hand, offers an orderly method of designing control sequences to execute machine instructions that utilizes programming techniques such as sharing common sequences among different machine instructions (subroutines) to provide simplicity as well as flexibility. This produces low-cost hardware circuitry while placing few restrictions on interconnection possibilities. It becomes the function of a microprogram to specify limits and define the assignments and transformations allowable to the general components. Thus, microprogramming offers the opportunity to match a collection of general hardware facilities to a set of system requirements.

The processors of the Faber et al application are microprogrammable, and have no order-set and no specific data structures. A processor can be specialized for the various roles it is to perform by replaceable microprograms which are made available from a manufacturer to satisfy different users. Thus, firmware can be alternatively defined as the word used for microprograms, developed by the manufacturers which will reside within a computer's control memory and which specializes the logic design for a specific purpose.

To implement multiprocessing in the prior art, a management control subsystem, including a group of management control programs, program parts, and subroutines is required for exercising supervisory control over the data processing system to insure the efficient operation of the processors so as to process a set of user programs effectively and concurrently by alternating and interleaving their execution. This group of management control programs, program parts, and subroutines is termed an "operating system." The primary purpose of an operating system is to maintain the user programs or processes in efficient concurrent execution by effective allocation of the limited system resources to the programs, these resources including the processors, the memories, and input and output equipment.

The software functions of the operating system of the prior art are all implemented at the macroninstruction (S-instruction) level. When an operating system function such as assigning input/output (I/O) channels or devices to programs is required by the system, the appropriate software function would have to be retrieved from memory and executed. Moreover, in the multiprocessing systems of the prior art, conditions are frequently encountered wherein a number of user programs or processes concurrently require the services of the same operating system program. However, because only one copy of each operating system program is usually available, all user programs or processes requiring a common operating system program must be queued to await service of the operating system. This situation seriously impairs the efficiency of a multiprocessing system.

Frequently in the prior art, an operating system program, while performing a service for a user program, requires, in turn, the services of another operating system program. For example, if an operating system program requires information from an auxiliary store it calls for an I/O supervisor program to obtain the information. An operating system program calling another suspends execution and the called program commences execution. However, the calling operating system program remains committed because it has not completed execution. Thus, at times a chain of operating system programs may be committed to provide services directly or indirectly for the same user program.

Therefore, the flexibility afforded an operating system is performing its task of resource allocation is related to the time in which the binding of programs and data takes place. In a multiprocessing system, binding of resources must occur close to execution time since a single user program or process must not be permitted to affect the binding policy of the entire system. Resources must also be released as soon as possible to permit reallocation to others.

Presently, the trend in computer science is toward multiprocessing systems which can increase processing efficiency, reliability and throughput. The control of these multiprocessing systems is more complex than that of conventional systems. Methods of development of these systems have in the past been limited by the hardware on which they are implemented. With the advent of microprogrammable computers, such as the one disclosed in the Faber et al application, firmware can now be developed to emulate a machine structure which can handle control structures more efficiently.

Through microprogramming, a particular set of system characteristics can be developed using a very basic but general collection of hardware tools. A microprogrammable processor allows for a "soft" or "virtual" computer which enables a system designer to develop a unique instruction set (S-language) for his particular system. Embedded in this instruction set can be those software functions frequently and consistently used in operating systems.

It is, therefore, an object of the present invention to provide an improved instruction set which includes software functions traditionally allocated to an operation system.

Another object of the present invention is to provide an improved operating system for a multiprocessing system.

Another object of this invention resides in a method of constructing an operating system for a multiprocessing system.

Another object of this invention resides in a method of controlling an array of microprogrammable processors such that they can function efficiently while dynamically sharing the load.

Another object of this invention is to emulate an instruction set, which includes those software functions frequently and consistently used in operating systems.

A further object of this invention is to provide an order code which will allow for easy table and list manipulation or handling.

A still further object of this invention is to provide the ability to write code independent of the data to be processed.

A still further object of this invention resides in a method of accessing data during execution of data independent programs.

SUMMARY OF THE INVENTION

The objects of the present invention are accomplished, in brief, by the use of special words, called descriptions with which all system resources, program and data are described, and an instruction set for sequencing these descriptions.

The descriptions which are provided for each user program or process, form part of a unique work area assigned within a contiguous block of memory for each process, and are used to locate data and programs, and to describe these areas for control purposes. Each work area contains all of the information necessary to describe the status of its process during execution as well as during any waiting periods for a processor.

Within every description there are the format fields, the length and location fields, and the qualification fields. The format fields define the structure and the format of the data. The length and location fields specify the location of the objects, the size of the object and any limits imposed. The qualification fields control access and govern the data usage. Also included in each description are various operating system flags which cause an operating system function, which heretofore could only be executed at the macroinstruction level, to be executed at the microprogram level. When executed, each bit in a description is evaluated and causes firmware to fetch, use or replace the desired object similar to the way a conventional instruction performs a given function.

In a typical situation, a commercial user of the multiprocessor system would write a program in a high level language such as ALGOL, which would then be compiled into a macrolanguage program, which would then be stored in memory for execution. Each macroinstruction, (S-instruction), which collectively comprises an S-language instruction set, is executed through the use of a description which provides basically two functions: (1) interpretation of the S-instruction, which may include calling for the next S-instruction, and (2) execution of the indicated S-instruction operation as defined by the various fields of the description and the operating system flags. Therefore, by the use of descriptions disclosed an instruction set becomes data independent, data information is kept out of the program stream, and those software functions frequently and consistently used in operating systems are emulated at the microprogram level.

The features of the present invention are illustrated in the drawings in which:

FIG. 9 is a block diagram illustrating the organization of a work area assigned to user programs or processes.

FIG. 15 is a composite illustration of the organization of the descriptions of the present invention.

DESCRIPTION OF THE PREFERRED EMBODIMENT

GENERAL

Figure 1:
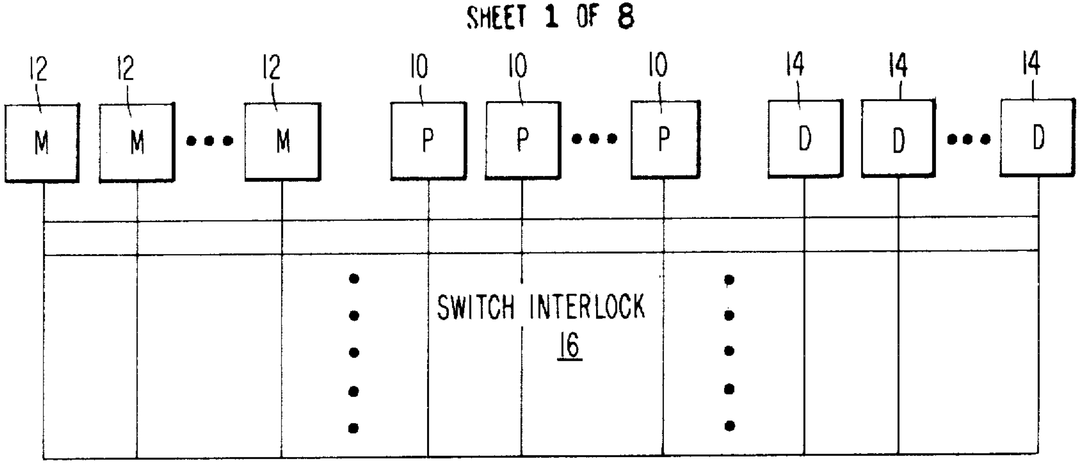
FIG. 1 is a simplified block schematic diagram of a multiprocess system adapted for the present invention.

The multiprocessing system of the present invention is comprised of four major elements or module types. These elements (FIG. 1) are a plurality of processors 10, memory modules 12 (S-memory), input/output devices 14, and a data exchange denominated the switch interlock 16.

Figure 2:
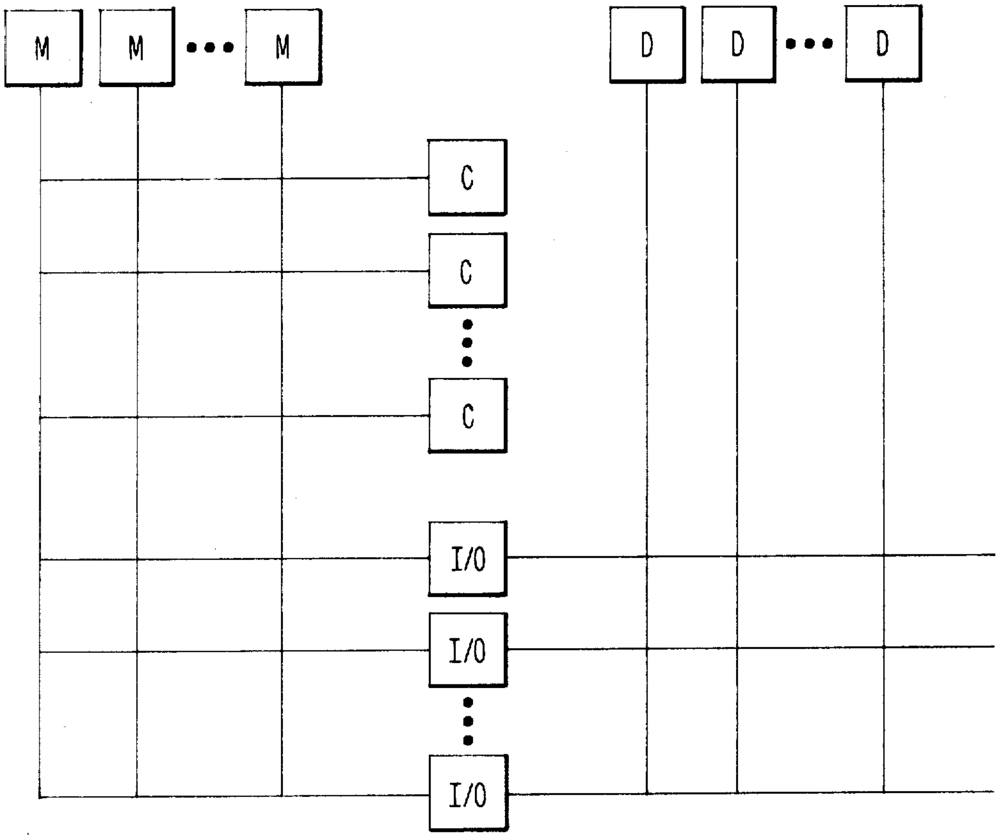
PRIOR ART Fig.2
FIG. 2 is a simplified block schematic diagram of a multiprocessor system illustrative of the prior art.

The memory modules 12 function much the same as the memory modules of a conventional multiprocessor (FIG. 2). The processor modules 10 may function alternately as a central processing unit (CPU), I/O or device controller module. Both the memory modules 12 and the processor modules 10 are interconnected to device modules 14 through the single exchange or switch interlock 16. As will be discussed in detail later, this system modularity is further enhanced with word width modularity in both the processor modules 10 and the switch interlock 6. This feature also leads to an unusually high emulation efficiency and problem/system matching capability.

Figure 3:
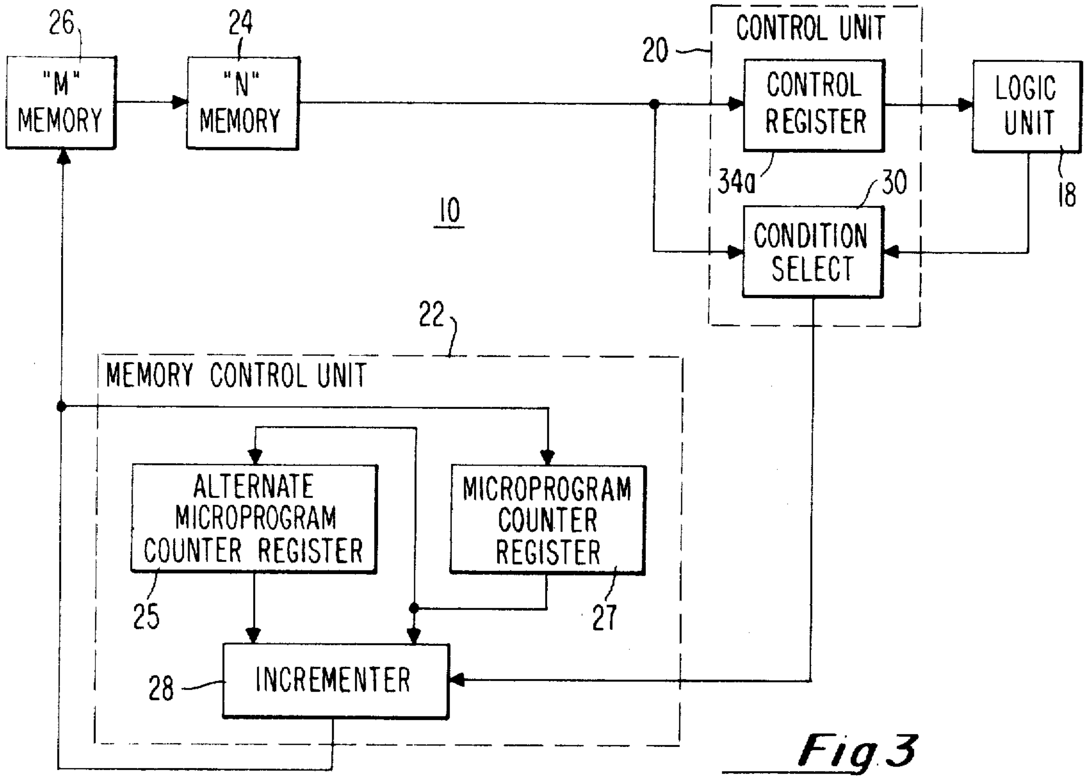
FIG. 3 is a block schematic diagram of a microprogrammable processor adapted for the present invention.

A processor suitable for the practice of the present invention is shown in FIG. 3. The organization and operation of the processor of FIG. 3 will be described in detail to the extent necessary to provide an understanding of the operation and interrelation with the multiprocessor with which the present invention is adapted. The processor of FIG. 3 is the subject of a U.S. Pat. Application by Ulbe Faber et al, Ser. No. 825,569, entitled "POLYMORPHIC PROGRAMMABLE UNITS EMPLOYING PLURAL LEVELS OF SUBINSTRUCTION SETS" filed May 19, 1969, and assigned to the assignee of the instant application, and is hereby incorporated by reference. A more detailed description of the organization and operation of the processor of FIG. 3 is to be found in the above-cited Faber et al application.

The processor 10, as the primary building block of the multiprocessing system adapted for the present invention, is partitioned into five functional units; namely, the logic unit (LU) 18, the control unit (CU) 20, the memory control unit (MCU) 22, the nanomemory (N-memory) 24 and the microprogram memory (M-memory) 26.

During the operation of a processor 10, microprogram instructions and literals (data, jump addresses, shift amounts) are read out of the M-memory 26. Data and jump addresses from the M-memory 26 are sent to the MCU 22, shift amounts to the CU 20, and instructions are used as addresses for the N-memory 24. The output of the N-memory is a set of 56 enable signals which are transmitted to the CU 20, MCU 22, and the LU 18.

The addressing of the proper location in the M-memory 26 is handled by the selection of one of two microprogram count registers, namely the alternate microprogram counter register (AMPCR) 25 and the microprogram counter register (MPCR) 27, in the MCU 22 and by using either the contents of the selected register 25 or 27, the contents plus one, or the contents plus two as the address to the M-memory 26. An incrementer 28 is provided in the MCU 22 for incrementing the contents of the registers 25 or 27.

LOGIC UNIT

The LU 18, as will be hereinafter explained in detail, performs all of the shifting, the arithmetic and the Boolean logic functions required, as well as providing a set of scratch pad registers and the data interfaces to and from the switch interlock (SWI) 16. Of primary importance is the modularity of the LU 18, providing expansion of the word length in eight bit increments from eight bits through 64 bits using the same functional type unit.

Figure 4:
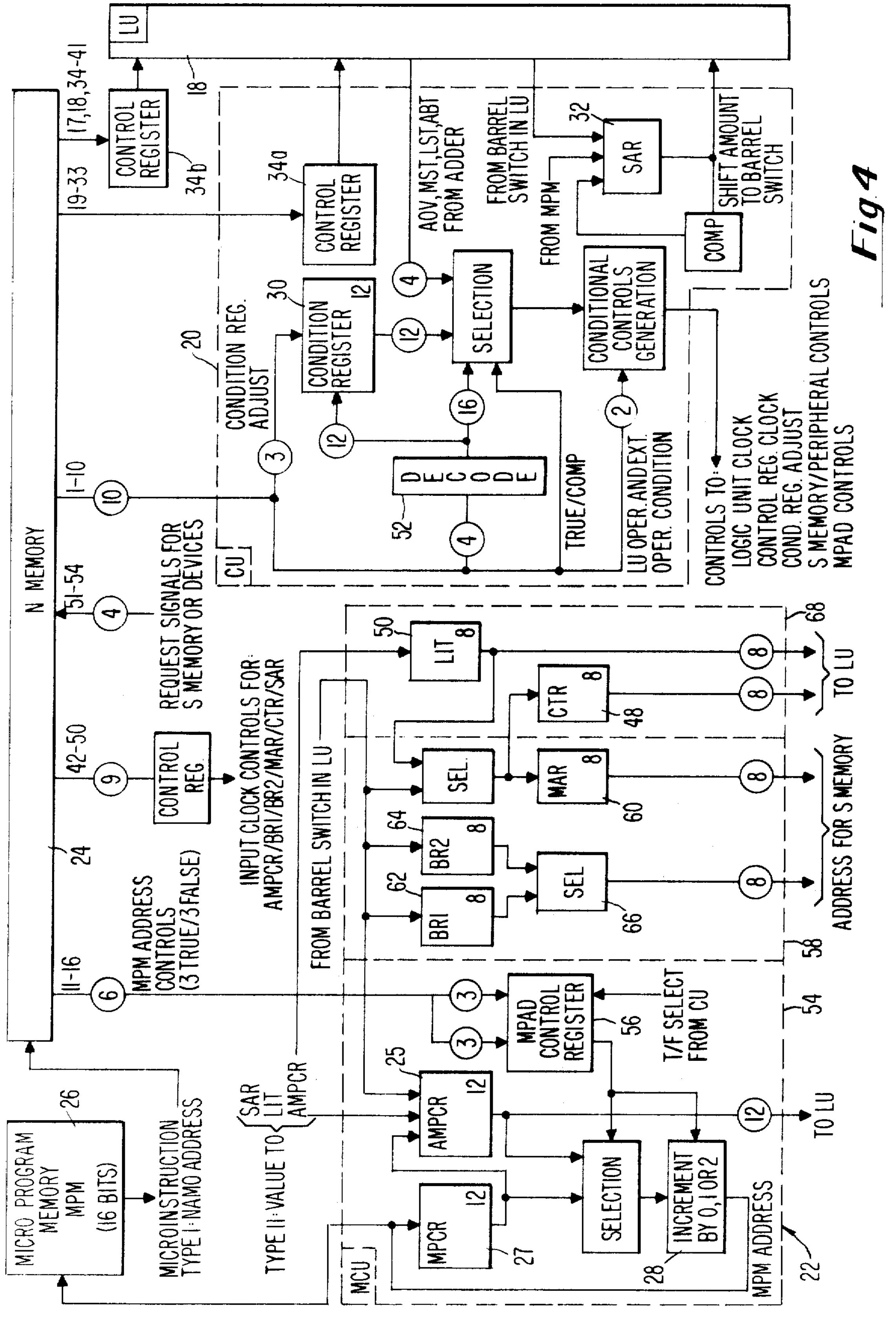
FIG. 4 is a more detailed illustration of FIG. 3.

The CU 20 comprises a condition register 30 having logic for testing conditions, a shift amount register (SAR) 32 (FIG. 4) for controlling shift operations in the LU 18, and part of the control register 34*a* used for storage of some of the control signals to be sent to the LU 18.

The MCU 22 provides addressing logic to the SWI 16 for data accesses, controls for the selection of microinstructions, literal storage, and counter operation. This unit is also expandable when larger addressing capability is required.

Figure 5:
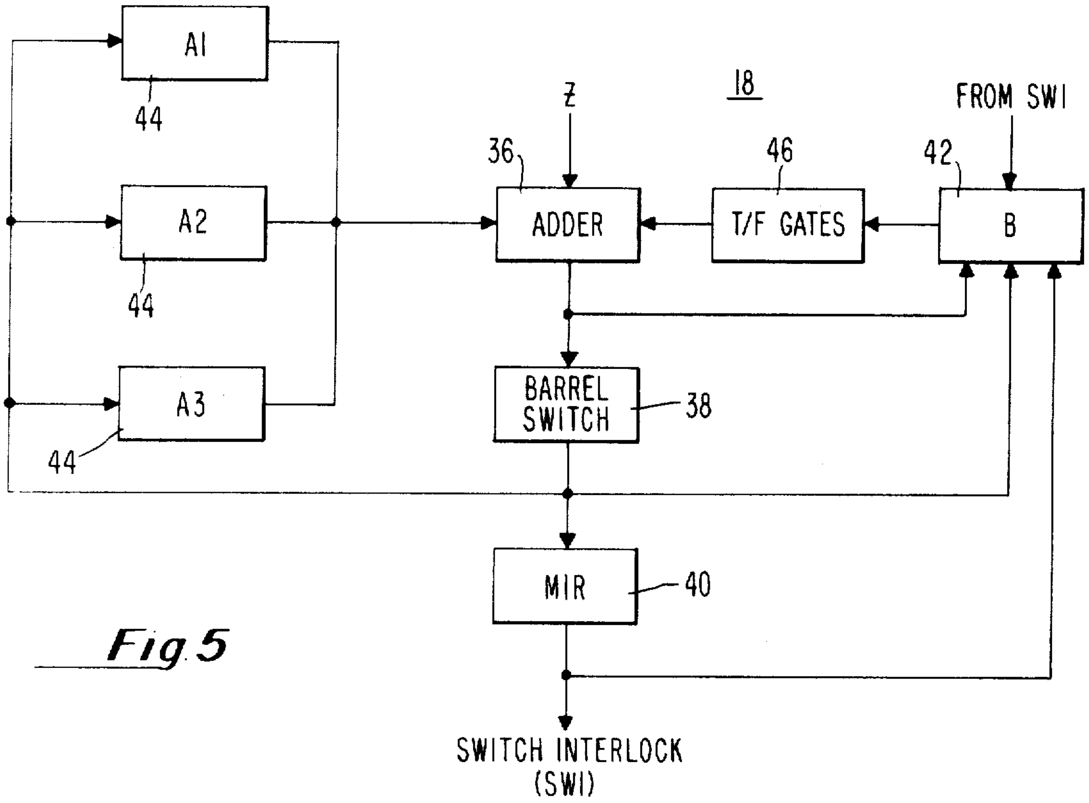
FIG. 5 is a block schematic diagram of a logic unit employed in the microprogrammable processor of FIG. 3.

A functional block diagram of LU 18 is illustrated in FIG. 5. The design of the LU 18 is predicated upon implementation with one LSI (large scale integration) silicon slice per eight bits. The LU 18 comprises an adder 36, a barrel switch 38, a memory instruction register (MIR) 40, a B register 42, and three A registers 44. All A registers 44 are functionally identical, temporarily store data within the processor 10, and serve as primary input to the adder 36. Any of the A registers 44 can be loaded with the output of the barrel switch 38 in one clock time. Selection gates (not shown) permit the contents of any A register to be used as one of the inputs to the adder 36.

The B register 42 is the primary external interface from the SWI 16. The register 42 also serves as a second input to the adder 36, and can collect certain side effects of arithmetic operations. The B register 42 may be loaded with the output of the barrel switch 38, the output of the adder 36, data from the switch interlock (SWI) 16, the output of the MIR 40, the carry complements of four or eight bit groups with selected ZEROs (for use in decimal arithmetic or character processing), and the barrel switch output OR'ed with *a*) the output of the adder 36, *b*) data from the SWI 16 or *c*) the output of the MIR 40.

The output of the B register 42 has true complement selection gates 46 which are controlled in three separate sections: the most significant bit, the least significant bit, and all the remaining central bits. Each of these parts is controlled independently and may either be all ZEROs, all ONEs, or the true contents of the complements (ONEs complement) of the contents of the respective bits of the B register 42.

The MIR 40 buffers information being written into the S-memory 12 or sent to a device 14, and is loaded from the output of the barrel switch 38. The output of MIR 40 is sent to the SWI 16, or to the B register 42.

The adder 36 in the LU 18 is a version of a straightforward carry lookahead adder well-known in the art. Therefore, the details of its operation will not be included.

Inputs to the adder 36, provided from selection gates (not shown) allow various combinations of the A, the B, and the Z inputs. The A input is from the A register output selection gates and the B input is from the B register true/complement selection gates 46 whose outputs were described above. The Z input is an external input to the LU 18 and can be: the output of a counter 48 in the MCU 22 into the most significant eight-bits of adder 36 with all other bits being ZEROs ; the output of a literal register 50 in the MCU 22 into the least significant bit of adder 36 with all other bits being ZEROS; an optional input (depending upon the word length) into the middle bytes of adder 36 (said middle bytes only existing in processors 10 that have word lengths greater than 24 bits) with the most and least significant bytes being ZEROs; or all ZEROs.

Using various combinations of input to LU 18 from the A register, B register via Z input or a selection gate (not shown) any two of the three inputs can be added together, or can be added together with an additional ONE added to the least significant bit. Also, all binary Boolean operations between any two adder inputs can be accomplished.

The barrel switch 38 is a matrix of gates that shifts a parallel input data word any number of places to the left or right, either end-off or end-around, in one clock time. The barrel switch is the subject of U.S. Pat. No. 3,510,903, patented Oct. 5, 1971, issued to R. A. Stokes et al, and assigned to the same assignee as the instant application. This patent is incorporated herein by reference and a detailed description of the operation of the barrel switch 38 can be found in the above-cited patent.

The output of the barrel switch 38 is 8*i* bits in parallel (where "*i*" is the number of eight bit LU modules 18) and is sent to: (1) the A registers 44, (2) the B register 42, (3) the MIR 40, (4) the least significant 16 bits to the MCU 22, and (5) the least significant three to six bits to the CU 20 (depending upon word length).

CONTROL UNIT

One CU 20 is required for each processor. The design of the CU 20 is predicated upon implementation of one LSI silicon slice. As generally referred to earlier, the major sections of the control unit (CU) 20 are: the shift amount register (SAR) 32, the condition register (COND) 30, part of the control register (CR) 34*a*, the M-memory content decoder 52, and a clock control 53, see FIG. 4.

The functions of the SAR 32 and its associated logic are: to load shift amounts into the SAR 32 to be used in shifting operations, to generate required controls for the barrel switch 38 to perform the shift operations indicated by the controls of the N-memory 24, and to generate the "complement" of the SAR 32 contents, where the "complement" is defined as the amount that will restore the bits of a word to their original position after an end-around shift of N (any number) followed by an end-around of the "complement" of N.

The condition register section 30 of the CU 20 performs four major functions: (1) stores 12 resettable conditions bits in the condition register 20, (2) selects one of 16 conditions bits for use in performing conditional operations (12 from the condition register 30 and four generated during the present clock time in the logic unit (LU 18), (3) decode bits from the N-memory 24 for resetting, setting or requesting the setting of a certain bit in the condition register 30, and (4) resolving priority between processors 10 in the setting of global conditions (GC) bits.

A global condition bit, when set, indicates a successfully performed lockout of all other processors. This bit can be set in, at most, one processor 10 at a time. It is set and reset locally within each processor 10. Testing this bit does not reset it. The 12 bits of the condition register 30 are used as error indicators, interrupts, status indicators, and lockout indicators.

The control register 34 is a 36-bit register which stores all control signals from the N-memory 24 that are used in the LU 18, CU 20, and the MCU 22 for controlling the execution phase of a microinstruction.

MEMORY CONTROL UNIT

One MCU 22 is required for each processor; however, a second MCU 22 may be added to provide additional memory addressing capabilities. The design of the MCU 22 is also predicated upon implementation with one LSI silicon slice. This unit has three major sections. The first section is the microprogram address section 54 which comprises the microprogram counter register 27, the alternate microprogram counter register 25, the incrementer 28, the alternate microprogram address control register 56 and associated control logic. This first section of the MCU 22 is used to address the M-memory 26 for the sequencing of microinstructions.

The second section of the MCU 22 is the memory/device address section 58 which comprises a memory address register 60, a base register 1 and a base register 2, 62 and 64 respectively, output selection gates 66, and associated control logic.

The third section of the MCU 22 is the Z register section 68 which comprises the counter 48 and the literal register 50 which are the *z* input to the adder 36 of LU 18.

N-MEMORY

The processor 10 is controlled by the output of a 56 bit wide N-memory 24 which may be implemented with a read/write memory, and read-only memory, wired logic or a combination of the three. In any case, it has a typical form factor of 64 words by 56 bits, expandable in 64 word increments up to 2,048 words. Each of the 56 bits represents a unique enable line to control the gates and flip-flops within the LU 18, the CU 20, and MCU 22. Each N-memory word represents a part of a specific microinstruction that is executed by the simultaneous presentation of a specific enable pattern for the 56 outputs represented by the corresponding ONEs and ZEROs in its word.

Theoretically, the N-memory 24 adapted for the present invention could provide $2^{56}(10^{17})$ different words or output combinations. This number of words in N-memory 24 is obviously more than adequate for a useful set of microinstructions. Somewhat fewer instructions would be considered reasonable. In fact, a N-memory size no greater than 512 words of 56 bits has been found to be suitable for most processor characterizations.

A unique feature of the multiprocessor system adapted for the present invention with its separate N-memory 24 and M-memory 26 is that the explicit enable lines for each microinstruction need be stored in the N-memory 24 only once, regardless of the number of times a specific microinstruction is needed in a program. To accomplish this saving of memory, the N-memory 24 contains not the full microinstruction needed, but rather the address in N-memory 24 where the explicit ONEs and ZEROs are stored that are needed to execute that instruction type. Thus, several microprogram sequences, each using the same microinstruction (e.g., transfer contents of A register 44 to B register 42) need only store in the M-memory the address of the N-memory word containing that operation.

M-MEMORY

Each processor 10 requires a source of microprogram instruction to define the operation of the processor. To maintain the clock period of the processor, this source must have a fast read access time and a cycle time less than the clock period just as for the N-memory 24. Slow read access time memories may be used, but this will add directly to the clock period. Two possible solutions for providing this source of microprogram instructions are a semi-conductor memory which can be a read/write memory or a buffer into a slower speed, wider word memory.

SWITCH INTERLOCK

The switch interlock 16 provides intercommunication among the processors 10, the memories 12, the devices 14 of the multiprocessing system. The connection with a device 14 is by reservation to exclusive use by a processor 10 and is maintained until released. Connection with a memory module 12 is for the duration of a single data word exchange but is maintained until some other module is requested or some other processor 10 requests that memory module.

The switch interlock 16 (FIG. 7) is the subject of U.S. Pat. No. 3,651,473 issued to Ulbe Faber, patented Mar. 21, 1972, and assigned to the assignee of the presen application. This patent is hereby incorporated by reference, and a detailed disclosure of the switch interlock 16 can be found in the above patent.

The SWI 16 is intended to connect many processors 10 to many devices 14 and to many memory modules 12. It is, therefore, important to keep the number of wires in the crosspoints to a minimum. Consequently, a variety of combinations of serial and parallel data transmission paths are allowable. The amount of parallelism depends on the band width necessary to complete the transmission in the number of clocks (usually one) required by the system. In the present system a serial transmission rate is significantly higher than the processor clock, and hence many bits may be transferred in one clock time.

Consistent with the building block philosophy of the multiprocessor system adapted for the present invention, the switch interlock 16 is partitioned to permit modular expansion for incremental numbers of processors 10, memory modules 12, or devices 14, and for various increments of data and address path widths. Each incremental module of the SWI 16 is predicated upon implementation with LSI, as are the other functional units of the processor.

Figure 6:
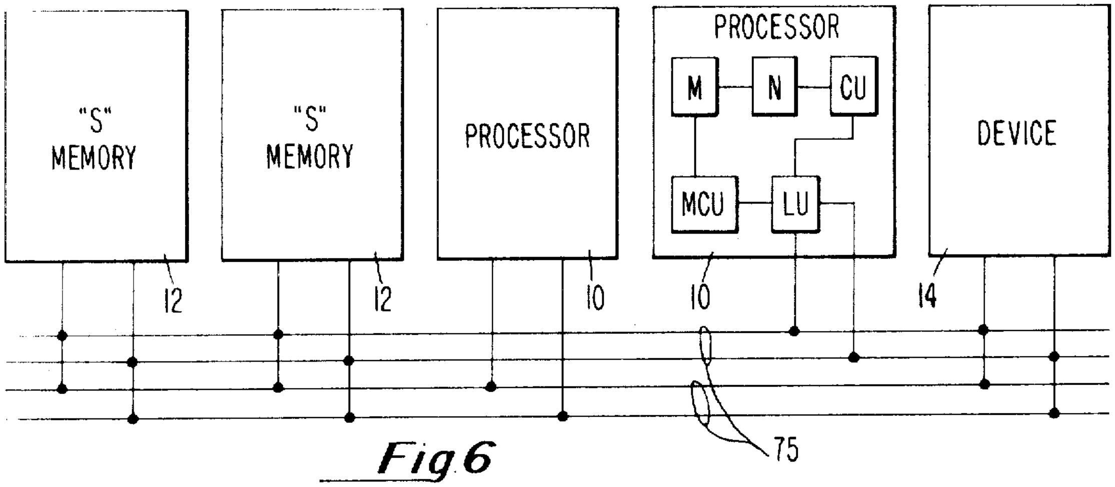
FIG. 6 is a simplified block schematic diagram of a switch interlock employed in the multiprocessor system of the present invention.

Functionally, the SWI 16 comprises a parallel-to-serial shift register 70 for each processor 10, a four-wire input and output data bus (FIG. 6) 75, a serial-to-parallel shift register 76 for each S-memory module 12 and each device 14, and associated control logic. A simplified block diagram of the switch interlock 16 is shown in FIG. 6.

Figure 7:
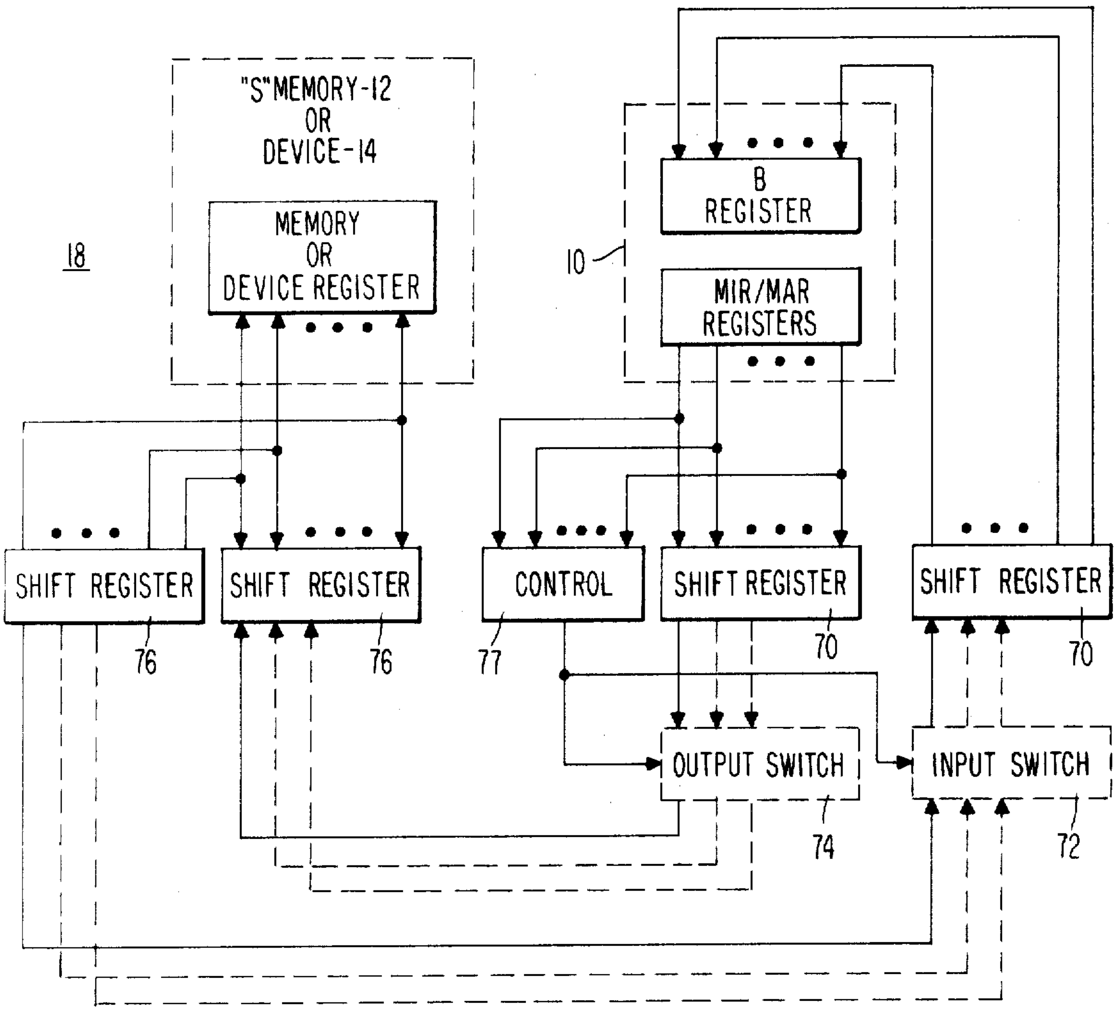
FIG. 7 is a block diagram which details the implementation of the switch interlock of FIG. 6.

The implementation of the switch interlock 16 is illustrated in FIG. 7, where the functional logic units shown are duplicated for both S-memory modules 12 and devices 14. The expandability of the switch interlock 16 is shown in FIG. 7 by the broken lines between input and output switches, 72 and 74 respectively, and the shift registers 70, 76 associated with the S-memory modules 12, devices 14, and processors 10. The input switch 72 and output switch 74 are connected directly to the shift register 70 and activated by a control unit 77.

Figure 8:
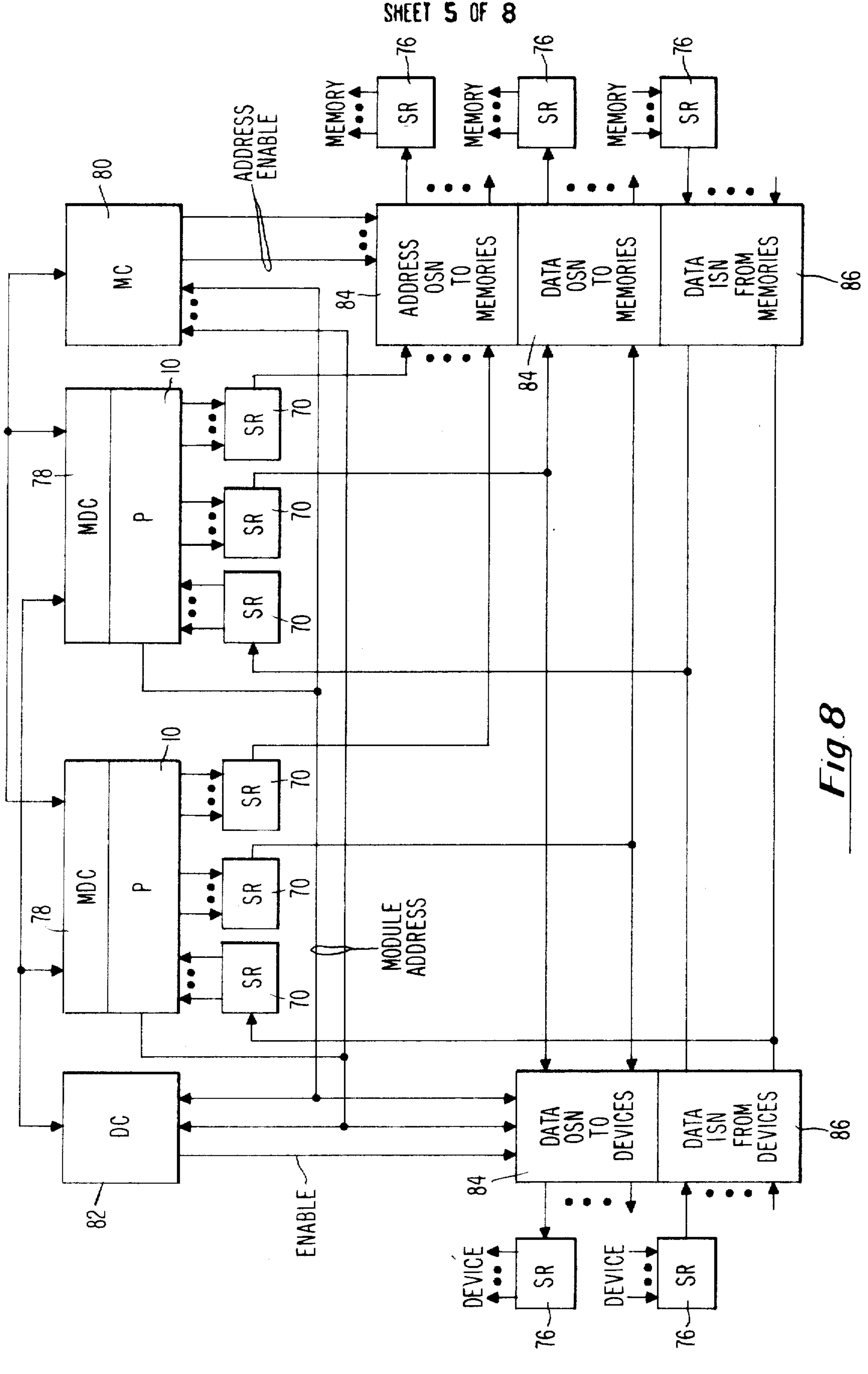
FIG. 8 is a detailed block schematic diagram of the multiprocessor system of the present invention.

There are six basic modules which comprise the switch interlock 16 (FIG. 8). They are the memory/device controls (MDC) 78, the memory controls (MC) 80, the device controls (DC) 82, the output switch network (OSN) 84, the input switch network (ISN) 86, and shift registers (SR) 70, 76.

The memory/device control (MDC) 78 is used as an interface between a processor 10 and the control in the memory unit (MC) 80 and the device control unit (DC) 78, and as a control for the high frequency clock (not shown) used for the serial transmission of data. There is one MDC unit 78 per processor 10.

The memory control unit (MC) 80 is for resolving conflicts between processors 10 requesting the use of the same S-memory module 12 and for maintaining an established connection after completion of an operation, until some other module is requested or some other processor 10 requests that memory module 12. This unit handles two to four processors and up to eight S-memory modules 12.

The device control unit (DC) 82 resolves conflicts between the processors 10 trying to lock to a device 14 and checks the lock status of any processor 10 attempting a device operation. This unit can handle up to four processors and up to eight ports.

The output switch network (OSN) 84 sends data from a processor 10 to an addressed device 14 or data and address from a processor 10 to an addressed memory module 12, (i.e., the OSN 84 is a "demultiplexer"). This unit can handle two bits for up to four processors and eight device ports or memory modules 12.

The input switch network (ISN) 86 returns data from an addressed device 14 or memory module 12 to a processor 10 (i.e., the ISN is a "multiplexer"). This unit can also handle two bits for up to four processors and up to eight device ports or memory modules 12.

The shift registers 70 and 76 are optional and, as previously described, are parallel-to-serial shift registers 70 or serial-to-parallel shift registers 76 using a high frequency clock. These units are used for serial transmission of data through the ISN's 86 and OSN's 84.

A processor 10 exercises control over the switch interlock 16. Specifically, in the multiprocessor system adapted for the present invention, only a processor 10 can issue control signals to access memory modules 12 or devices 14. A memory module 12 or device 14 cannot initiate a path through the switch interlock 16. They may, however, provide a signal to the processor 10 via a display register (not shown) or other similar external request device and may send control signals to the MDC 78. Transfers between devices 14 and memories 12 must be via and under the control of a processor 10.

Controls are routed from a processor 10 via the MDC 78 to the MC 80 and the DC 82 which, in turn, check availability, determine priority, and perform the other functions that are characteristic of the switch interlock 16.

The last major component of a multiprocessor system adapted for the present invention includes all of the conventional computer systems peripheral devices such as disk files, magnetic tape units, high-speed line printers, card readers, card punches, teletype devices, etc. No detailed description of these devices will be presented here since the specific characteristics of these devices are well-known.

The philosophy of device operations is based upon a processor 10 utilizing a device 14 for a "long" period of time without interruption. This is accomplished by "locking" a processor 10 to a device 14. The ground rules for device operations are (1) a processor 10 must be locked to a device port to which a read or write signal is issued, (2) a processor 10 may be locked to several device ports at the same time, (3) a device port can only be locked to one processor 10 at a time, and (4) since only the processor that is locked to a device port can unlock it, when a processor is finished using a device port, it should be unlocked so that other processors can use it. The exception to the fourth ground rule is the situation where devices 14 locked to a failed processor may be unlocked with a "privileged" instruction by another operative processor.

Memory-like modules normally cannot be locked by a processor 10 and a minimum access time and a short "hold" time are assumed as to a memory module 12 by any single processor 10. Conflicts in access to the same memory module 12 are resolved in favor of the processor 10 that last accessed the module, otherwise the highest priority requesting processor 10. Once access is granted, it continues until that memory operation is complete. When one access is complete the highest priority request is honored from those processors then in contention. The processor 10 completing access is not able to compete again for one clock period. Thus the two highest priority processors are assured of access to a memory module 12. Lower priority processors may have their access rate significantly curtailed.

S-LANGUAGE

Having now described the structure of a multiprocessor system utilizing microprogrammable building blocks (processors), a machine structure implemented via system firmware on the programmable building blocks will be described. Inherent in this machine structure is a unique instruction set ("S" language) developed to aid in the construction of the multiprocessor operating system (i.e., operating system functions which schedule, handle communications, handle resources, will be embedded within the "S"-language).

Multiprogramming requires the ability to interleave the execution of user programs or processes. Thus, a processor 10 is not exclusively allocated to a process for its entire execution time but may be shared by many processes. The present system accomplishes multiprogramming by a technique of queueing and dynamic resource allocation. Each process is a set of resources which must contain all of the information necessary to describe its own status during execution as well as during the waiting period for a processor 10. This concept is implemented by creating for each process its own unique work area 100 containing a stack 106 (FIG. 9). Thus, two resources always necessary for every process in order to function are a unique work area 100 and a processor 10.

Parallel processing occurs in the present system when more than one processor is available on the system. Processes may then be executed simultaneously. The system structure is such that a processor 10 is treated as another resource, allowing processors to be easily added or deleted from the system. A mechanism required for parallel processing in the present invention is the "lock" instruction. This instruction will prevent simultaneous accessing of data for execution of code by independent processors (e.g., two processors simultaneously allocating the same free memory space). A processor entering system table must lock out all other processors until it becomes safe for them to proceed again without the danger of conflict.

Every process or user program in the system is assigned its own unique work area 100 which is used in a variety of ways during program execution. A stack structure for the work area of a process has been assumed. The stack structure allows for smaller program syllables, recursive programming, rapid expression evaluation and rapid procedure entry and exit. However, other well-known structures for the work area can be utilized without departing from the spirit of the present invention.

The work area 100 of the process of the present invention comprises a state vector 102, a program reference table (PRT) 104 and the user stack 106. State vector 102 designates the registers and temporary storage used by the systems firmware which fully describes its status. The program reference table 104 designates a list of the descriptions of the program segments 108 as well as the data and file segments 110 reserved for the assigned process. The user stack 106 provides the program with facility for temporary storage of data and a dynamic program history of the assigned process. The ability to transfer control to a remote subroutine and return is provided by the stack mechanism. The bookkeeping required to save the address of the calling routine and reserve working area for the subroutine is provided by the instruction logic (not shown) defining subroutine transfer.

The program work area 100 is placed in any contiguous block of S-memory 12. The starting address of any process is its base work area register (BWA) 105 of the state vector 102 or the address of the start of its work area 100. When a process is initiated it is assigned a work area 100 and the address of its work space is placed in base register 62 of the processor 10. Since the work area 100 contains the state vector 102 of the process, all the information necessary for starting the process running is available.

Program segments are also placed into blocks of contiguous memory 12 which may start anywhere. A description is utilized to point to the starting location of the program, which will be in the base program register (BPR) 112 of the state vector 102. A transfer of control within a program segment may add a literal specified in a branch syllable to the BPR 112 and the results placed in a program count register (PCR) 114 which points to the present syllable of a program being executed. The PCR 114 is defined by the state vector 102.

When a process references an object in its work area 100 a relative address is used. Thus, absolute addresses are not needed at execution time. When an instruction references through the PRT portion 106 of the work area 100, it accesses a description found there. Descriptions are the only objects which may contain absolute addresses for locating program segments or data.

All fields in the microprogrammed processor 10 are described by one or more descriptions. Descriptions are words utilized to locate data and program areas and to describe these areas for control purposes. A description is executed and causes the system firmware to fetch or execute the desired object just as conventional operators call a processor to perform a given function. These descriptions can locate the requested information, describe its structure, impose controls on the use of the information and provide signals to the operating system for special functions. By describing data with descriptions, information is kept out of the program stream. Thus, code is not inflated and programs can be data independent.

There are several fields to be evaluated in every description, as illustrated in FIG. 15. The format fields 116 describe the structure and format of the data. The qualification field 118 controls the access and governs the usage of data. The length and location fields 120 specify where to locate the object and the size of the field and its limits. Operating system flags 122 are also included in descriptions.

There are two types of descriptions utilized in the present invention. The first is an indirect pointer or holder indirect description 126 which is used primarily to define the format of the object to be accessed. An indirect description (initial indirect description) 128 may also contain the qualification fields 118 and always points to another description. The other is a direct description 140 which is a pointer to the desired object space. A direct description 140 which stands alone, always refers to a machine word sized object.

In the preferred embodiment all descriptions are 32 bits in length. In a direct description 140 (FIG. 10) the first, third, fourth and seventh bits are assigned operating system flags 122, the second and eighth bits are location fields 120, the fifth and sixth bits comprise the qualifications field 118, the ninth through the sixteenth bit comprise the format field 116, and the seventeenth through the thirty-second bit comprise the address portion 124 of the location field 120.

In an initial indirect description 128 (FIG. 11) having a qualification field 118, the first, third, fourth and eighth bits are assigned operating systems flags 122, the second, fifth, sixth and seventh bits comprise the location field 120, the eleventh through sixteenth bit comprise the format field 116, the ninth and tenth bits comprise the qualifications field 118, and the seventeenth through the thirty-second bit comprise the address portion 124 of the location field 120.

In a holder indirect description 126 (FIG. 12) for which the qualification information is assumed, the first eight bits and the seventeenth through the thirty-second bits are identical with the initial indirect description 128 having a qualification field 118. However, the ninth through sixteenth bits now comprise part of the format field 116.

Briefly, the format field 116 defines the structure of a holder element, the nested structure of holders and the byte or unit size of the smallest element, or it may define the type element being used. The location field 120 indicates where the data may be found. This may be an absolute address in the S-memory module 12 or an address relative to the base work area register (BWA) 105 or a base subroutine register (BSR) 156 of the state vector 102. The qualification field 118 determines the use of the defined object.

In operations requiring the evaluation of a chain of descriptions, the qualification is caused to change in the direction of more restricted use. For instance, a user may be allowed to both read and write in some data area where another user will only be allowed to read this area. The operating system, on the other hand, may have read/write access to all programs, however, users may only execute this data as program.

The length of data fields must be located within a description. This will bound the operations setting the limiting factors on data fields. Bounds checking is ccomplished by using the length fields for limits.

Figures 10, 11, 12, 13:
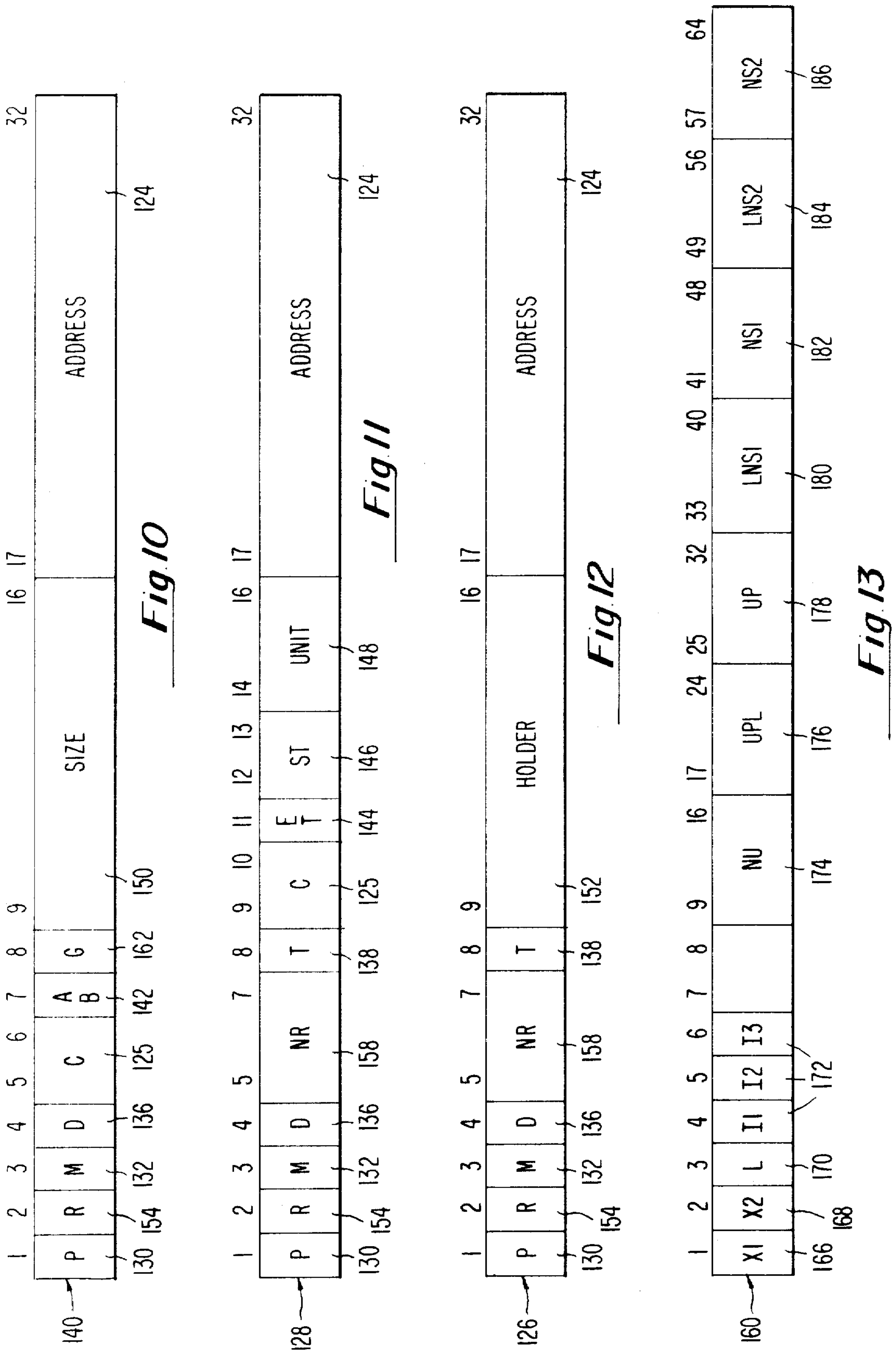
FIG. 10 is a diagram illustrating the format of a direct description.
FIG. 11 is a diagram illustrating the format of an initial indirect description.
FIG. 12 is a diagram illustrating the format of a holder indirect description.
FIG. 13 is a diagram illustrating the format of a name register utilized in the present invention.

To aid in the discussion that follows, a consolidation of the various bits which comprise a description are as illustrated in FIG. 15 and amplified in FIGS. 10–12.

Regardless of the type description, each bit is evaluated and causes the system firmware to perform a specific function. The presence of the following operating system flags 122 causes an operating system function to be executed.

Presence bit (P) 130: When the presence bit 130 is ON it indicates the object to be accessed is not necessarily in memory 12 and must be retrieved using the firmware developed as the operating system allocate memory function. In the case of an indirect description 126, 128, the next object to be retrieved is another description. The presence bit 130 is assigned the first bit position in all descriptions.

Monitor (M) bit 132: The monitor bit 132 is used by the operating system for checking the use of special data. If any one of the monitor bits 132 along an access path is ON, the object, when finally accessed, should be monitored by the operating system. The monitor bit 132 is assigned the third bit position in all descriptions.

Direct description (D) bit 136: When the direct description bit 136 is ON, the description being processed is treated as a direct description or the end of an evaluation chain. Otherwise it is assumed that the present description is pointing to another description. The direct description operating system flag 136 is assigned the fourth bit position in all descriptions.

Type of indirect description description bit (T) 138: When the field of operating system flag 138 is set with a ONE, the indirect description is an extension description (holder indirect 126) and contains a holder field 150 which defines a subfield containing the previously defined objects. If the T bit 138 is set with a ZERO, the description defines the object desired, the control imposed and general structure of the space and element to be accessed. The T bit 138 is only found in indirect descriptions and is assigned the eighth bit position.

Alter bit (AB) 142: The alter bit 142 is used by the operating system functions during memory allocation. If ON, it indicates that the object in memory has been altered during its residence in main memory 12. Thus an object must be copied back to secondary storage only if it has been altered. The alter bit 142 is found only in direct descriptions 140 and is assigned the seventh bit position in that type description.

Turning now to the qualification field 118 which determines how the defined object can be used, an object can be referenced with different controls (C) 125 imposed upon the referencing program. In many situations, the controls 150 imposed upon a user program may change according to the access path assigned. If both a direct and indirect description have different controls 125 imposed, the user program will abide by the most restrictive of the two controls 125 during the access. The qualification field 118 is two bits in width and occupies the fifth and sixth bits in a direct description 140 and the ninth and tenth bits in an initial indirect description 128. If both bits of the qualification field 118 are ZERO, only a read/write operation is allowed. If the first bit is ZERO and the second bit is a ONE, a read append (write not allowed) operation can occur. If the first bit in the qualification field 118 is a ONE and the second bit a ZERO, a read only operation is imposed. If both bits in the qualification field 118 are ONE, then an execute only control is imposed.

As briefly discussed earlier, the format field 116 defines the structure of holder elements, the nested structure of space and the byte or unit size of the smallest element. In the preferred embodiment, various format definitions are available.

The element type (ET) bit 144 found only in a holder indirect description 128 indicates the object or objects selected are of type integer if the ET bit 144 in the description is a ZERO or of type floating point if the ET bit 144 is a ONE. The ET bit 144 is assigned the eleventh bit position in a holder indirect description 128.

The structure (ST) 146 definition of a format field 116 is two bits in width and is peculiar only in initial indirect descriptions 128, occupying the twelfth and thirteenth bits of that description. The structure of the most global space is defined in the initial description. All of the other spaces nested within this space are assumed to be a vector space. If both bits in the ST format definition 146 are ZERO, then a vector space structure is defined. If the first bit of the ST format definition 146 is a ZERO and the second bit a ONE, a stack structured space is defined. If a ONE exists in the first bit and a ZERO exists in the second bit of the ST format definition 146, a queue structured spaced is defined. If both bits of the ST format definition 146 are ONEs, a link list structured space is defined.

The unit (UNIT) 148 format definition is defined as the size of the basic measure within a structure. The unit format definition 148 is three bits in width and is found only in initial indirect descriptions 126, occupying the fourteenth through the sixteenth bit position of that type description. The UNIT format definition 148 is calculated as follows: for the UNIT field 148 = 0 (binary representation) the basic measure is 1 bit; for the UNIT field 148 = any integer less than or equal to 6 (binary representation) the basic measure is 2 raised to the power of the integer bits, up to 64 bits.

The size (SIZE) format definition 150 is found only in direct descriptions 140 and occupies the ninth through the sixteenth bit of that description. The size format 150 designates the number of elements of the most global defined holder field which can fit into this defined space.

The last format definition utilized in the preferred embodiment is the holder (HOLDER) field 152. The holder field 152 is found only in holder indirect descriptions 126, occupying the ninth through the sixteenth bit in that type description. The holder field 152 contains the number of UNITS 148 or previously defined holder fields 152 which can fit into this next substructure. If the previous description defined a UNIT 148 of 2, (four bits) then a holder 152 value of 10 will indicate 10 four bit units can fit in a holder 152 (or a 40 bit element). If the next holder description indicates three of the above holders can fit into the next subspace, then it is defining a 120 bit substructure. When the holder field 152 is ZERO, no new structure is added to the presently defined space. Thus, the description is really a dope vector which points to another description or set of descriptions.

The location field 120 indicates where the data may be found. As stated earlier, this may be an absolute address in the S-memory module 12 or an address relative to the work area 100. The setting of a presence bit 130 in a description may indicate that the object is not in main memory 12. Thus a different kind of address identification is necessary to locate the data.

The relative address identification (R) field 154, when set with a ONE indicates the address in the ADDRESS field 124 of a description is relative to the base work area (BWA) register 105 or the base subroutine register (BSR) 156. A ZERO set in the relative address field 154 of a description indicates the address is absolute. The relative address field 154 is common to all descriptions and occupies the second bit position in each type of description.

The name register indicator (NR) 158 designates the number of the name register 160 (described later) which contains the value to be used to isolate the next description from an array of descriptions. The NR indicator 158 is three bits in width and is found only in indirect descriptions 126, 128 occupying the fifth through the seventh bits in indirect descriptions 126, 128. If the NR indicator field 158 of an indirect description 126, 128 equals zero (binary representation), then no address modification is executed when accessing the next description in the chain, and the ADDRESS field 124 points directly to the next description. If a name register field 158 is selected, the value in the UP field 178 (described later) of the specified name register 160 is used to modify the address field 124.

The global identification bit (G) 162 is peculiar only with direct descriptions 140 and occupies the eighth bit of this type description. If the global identification bit 162 is a ONE, then the global name register 164 (described later) will be used in the calculation of the address for accessing the desired object. If no indirect description 126, 128 has been used, the unit length is assumed to be word size. No global name register 164 is required if the global identification bit 162 is ZERO. In such situations, the first or next (depending upon the structure) object is accessed.

If a direct description 140 evaluation is being performed, then the starting address is formed using the global name register 164, coupled with all the format information gathered during the description evaluation cycle. This is only true if the global identification bit 162 is a ONE.

Name registers 160 (FIG. 13) allow for the naming of a particular element or group of elements in a structure during instruction execution. Name registers 160 may be used as a means of looping through a commonly named group of elements or just using a single element. In the preferred embodiment, name registers are 65 bits in width.

There are eight name registers 160 available for use, namely NR1.....NR7 and the global name register GNR 164. As previously discussed, the global name register 164 is utilized for developing the final name during description evaluation. All eight name registers 160 are defined by the state vector 102.

Just as a description is executed to retrieve an object, a name register 160 must also be similarly evaluated causing the system firmware functions to be executed.

The first bit of a name register 160 is the nested space bit X1 166. When the nested space bit 166 is set with a ONE, a nested space structure must be evaluated to locate the desired element. If the X1 bit 166 is set with a ZERO, then there is only a single group of elements within the structure to be evaluated.

The second bit of a name register 160 is the X2 nested space bit 168 utilized to indicate if more than one level of nesting exists within the structure. The X2 bit 168 is only checked if the X1 nested space bit 166 is set with a ONE.

The third bit of a name register 160 is the multi element access bit L 170. If the multi element access bit 170 is set with a ONE, then a multi element type operation will be performed by the S-instruction set. For instance, a search instead of a compare will be executed. If the multi element access bit 170 is set with a ZERO, then a single element operation will occur.

The next three bits in a name register 160, namely I1, I2 and I3, are multi element flags 172 which specify which of the nested indices change during a multi element type operation. These flags 172 are only used if the multi element access bit 170 is set with a ONE.

The seventh and eighth bits of the name register 160 are unassigned. The next eight bits (9–16) comprise the number unit (NU) field 174. The number of units to be accessed during instruction execution is defined by the number unit field NU 174. If NU 174 equals 0 or 1 (binary representation), then only one unit is used. The unit size of an operation is defined in the indirect description. If it is not defined, then it is assumed to be word size.

The two eight bit bytes (17–24 and 25–32) following the NU field 174 are assigned to the unit position limit (UPL) field 176 and the unit position (UP) field 178, respectively. The UP field 178 defines the position of the smallest unit within the next larger vector. For instance, if the UP field equals 5 (binary representation), then it indicates the fifth unit within the containing space. The maximum unit position 178 allowed is found in the unit position limit (UPL) field 176.

The eight bits (33–40) of the name register 160 following the unit position field 178 are assigned to the LNS1 field 180. This field defines the maximum number of basic holder spaces (2 dimension) which may be accessed within a more global holder.

Following the LNS1 field 180 is the NS1 field which defines the second dimension space position within a structure which is composed of an integral number of spaces of a fixed size, which in turn is composed of an integral number of units. These spaces are within a more global holder. In essence the NS1 field 182 contains the position of the smallest vector structure within the next larger structure within the containing physical area.

The remaining two eight-bit bytes (49–56 and 57–64) are allocated to the LNS2 field 184 and the NS2 field 186, respectively. The NS2 field 186 defines the third dimension space position with the most global structure which is composed of an integral number of these spaces. The LNS2 field 184, defines the maximum number of NS2 spaces to be accessed within the global space.

With regard to the ADDRESS field 124 of a description, if the relative address field R 154 is set with a ONE, then the address is assumed to be a relative address and the most significant bit of the ADDRESS field 124 determines which register is used as the base for the relative address field 154. If the most significant bit is set with a ONE, the address is base subroutine register (BSR) 156 relative, else it is base work area register (BWA) 105 relative.

Figure 14:
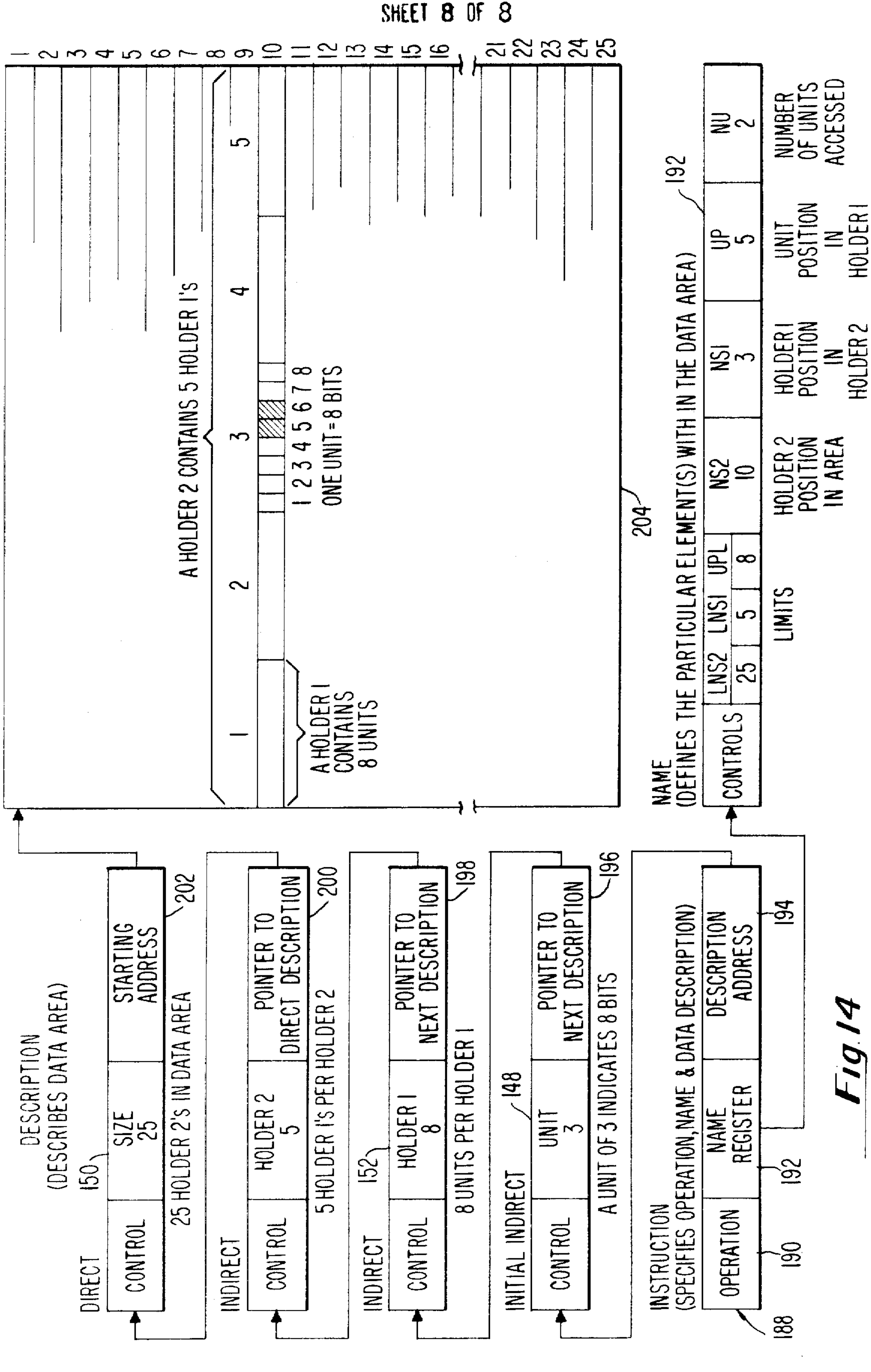
FIG. 14 is an example of a data accessing process incorporating the features of the present invention.

An example of data accessing utilizing name registers 160 and descriptions of the present invention can be understood with reference to FIG. 14. An instruction 188 specifying an operation 190, a particular name register 192 and a description address 194 is executed through a chain of indirect and direct descriptions to access a data area 204. For purposes of discussion the operation 190 specified by the instruction will be disregarded. The description address portion 194 of the instruction 188 points to an initial indirect description 196 having a UNIT format 148 equal three, indicating the size of the basic measure within a structure is 8 bits. The address field 124 portion of the initial indirect description 196 points to a holder indirect description 198 having a holder 1 format 152 equal eight, indicating there are eight units per holder 1. The ADDRESS field 124 of holder indirect description 198 points to a second holder indirect description 200 having a holder 2 format field equal 5, indicating five holder 1's per holder 2. The ADDRESS field 124 of holder indirect description 200 is a pointer to a direct description 202 having a size format 150 equal 25, indicating that there are 25 holder 2's in the data area. The ADDRESS field 124 of direct description 202 contains the starting address of the data area 204.

The name register 192 defined by the instruction 188 defines the particular elements within the data area 204 as shown in FIG. 14.

To address a bit position in memory within a structure the following formula is used:

$$\text{BP (Bit Position)} = \{[(\text{NS2-1} \times \text{Holder 2}) + \text{NS1-1}]\ \text{Holder 1} = \text{UP-1}\}\ \text{UNIT} \qquad (1)$$

$$\text{Address} = \text{Starting Address} + \text{BP} \qquad (2)$$

In the preferred embodiment there are four built-in basic regular data structures defined for information written in the S-language: vector, stack, queue, and link list. All objects within a regular structure are of equal length. Accessing elements of different lengths within vectors requires dope vectors or several indirect descriptions. To access different lengths, the NU field 174 of a name register 160 is used to define the number of units in a given access.

The vector is the most commonly used structure in the preferred embodiment. If an object is a vector, all accesses to it are made via a description combined with the setting of a name register. Sequenced operations for vectors and link lists may be performed with one instruction if a name register 160 is set accordingly.

A vector may be composed of vectors, each vector being an element of the outer vector. These smaller vectors are composed of a fixed number of equal sized elements. Similarly, another dimension may be added so that each element of the inner vector is a vector. Thus, three levels of structure (dimensions) may be available with one defined data area.

The three non vector data structures refer only to the outer most structure if nested structures are used. The inner structures, if they exist, are always vectors.

In the present invention the length of an S-instruction will be mostly eight bits or one byte size. However, there are 16 bit instructions (two bytes) and when necessary, three byte instructions. A ZERO in the first bit position of the operator portion of an S-instruction indicates a one byte instruction, while a ONE indicates an S-instruction of two bytes or more.

One byte S-instructions utilizes the stack 106, name registers 160 and an accumulator 206 for accessing descriptions and/or variables, while longer instructions assume a relative address for accessing data. The accumulator 206 is defined by the state vector 102.

Irrespective of the length of an S-instruction, the power behind each instruction is attributed to the description mechanism. As can be appreciated from the above discussion, a simple compare operation can become a search when accessing a vector, or an add operation may become a summation. Field isolation is accomplished automatically so that data may be packed in the most efficient manner without being hampered by word boundaries. The instruction set or S-language is completely flexible, allowing instructions to be changed, added or deleted until an ideal set is achieved. The order code is totally soft as is the selected register set. Thus, the language requirements may be modified until the designed system is firmly developed.

The above-described data descriptions of the S-language are excellent examples of the power of microprogramming. To implement equivalent functions in software as is performed in the prior art consumes considerable amounts of valuable processing time. To implement equivalent functions in hardware would provide much faster execution times, but would result in hardware so complex as to be impractical. However, when implemented in firmware on a microprogrammable processor 10, most of the advantages of hardware implementation are provided without the accompanying hardware complexity.

From the above specification, it will be recognized that a technique for interconnecting many small microprogrammable processors into one system, and a capability of controlling this array of microprogrammable processors so that they can function efficiently while dynamically sharing the load is disclosed. Not only does this technique allow the flexibility of microprogramming to be applied to large-scale systems, but it also allows systems of virtually any size to be constructed and provides for smooth evolution from a very small system to a very large one. Furthermore, it provides a degree of simplicity in logistics and maintenance not previously possible in medium or large scale systems, because the entire system is constructed using relatively few different types of simple modules.

While only one embodiment of the present invention has been described and illustrated, it will be apparent to those skilled in the art that changes and modifications may be made without departing from the spirit and scope of the invention as claimed.

What is claimed is:

1. In a multiprocessor system having at least one addressable memory for storing arrays of information and a plurality of programs, each of said programs including a source of descriptions and having at least one instruction including name register and description pointer information, each of said processors having a first memory for storing sets of operational command instructions and a second memory for storing sets of control instructions, a method for accessing stored data during execution of said programs comprising:

retrieving from said addressable memory an instruction including name register and description pointer information;

retrieving from said first memory a first set of operational command instructions in response to said instruction;

allocating a contiguous block of said addressable memory in response to said first set of operational command instructions;

transmitting to said contiguous block of said addressable memory said source of descriptions associated with said instruction;

generating a source of name registers in said contiguous block of said memory for isolating specific data within said stored arrays of information specified by said name register and description pointer information of said instruction from said addressable memory;

executing said instruction for retrieving said specific data;

retrieving from said first memory a second set of operational command instructions in response to said executing of said instruction for retrieving;

retrieving from said second memory a control instruction in response to one of said command instructions of said second set.

2. The method of claim 1 also including after said step of transmitting the steps of:

formatting specific data in said arrays of information in said addressable memory;

identifying said specific data within said information stored in said addressable memory; and conditioning the usage of said specific data during program execution; and wherein said step of generating utilizes said specific data.

3. The method of claim 1 wherein said step of generating includes the steps of:

structuring said specific data within said arrays of information stored in said addressable memory into a plurality of units; and limiting the bounds of said specific data with said arrays of information stored in said addressable memory; and wherein said step of executing includes the step of:

controlling the retrieving of said plurality of units within said stored arrays of information.

4. The method of claim 1 wherein said step of executing includes the steps of:

scanning said source of descriptions and said source of name registers in said contiguous block of said addressable memory in response to said name register and description pointer information;

decoding said source of descriptions for developing addresses for said stored information; and selecting said specific data as indicated by said name register pointer information.

5. The method of claim 4 including after the step of selecting the additional step of:

sequencing said specific data as indicated by said name register pointer information.

6. A data processing system comprising:

a plurality of microprogrammable processors having a first memory for storing sets of operational command instructions and second memory for storing sets of control instructions;

a plurality of addressable memories for storing data and instructions specifying routines;

a plurality of input/output devices;

a switch interlock for transferring data and command information between said processors, said devices and said addressable memories;

first means within each of said processors coupled to said switch interlock and adapted to receive one of said routine instructions for defining the operation of said processing system;

second means coupled to said first memory within each of said processors responsive to the receipt of one of said routine instructions by said first means for fetching a command instruction from said first memory, and third means coupled to said first and second memories within each of said processors, said third means being responsive to certain ones of said command instructions for receiving a control instruction for controlling the operation of said processing system.

7. The processing system of claim 6 wherein said swisch interlock comprises:

a parallel-to-serial shift register for each of said microprogrammable processors; and a serial-to-parallel shift register for each of said addressable memories and said devices.

* * * * *